(12) United States Patent
Tuffin

(10) Patent No.: US 6,559,919 B1
(45) Date of Patent: May 6, 2003

(54) LIQUID CRYSTAL DEVICE MANUFACTURING METHODS OF CONTROLLING A PARTIAL SWITCHING

(75) Inventor: Rachel Patricia Tuffin, North Malvern (GB)

(73) Assignees: Sharp Kabushiki Kaisha, Osaka (JP); The Secretary of State for Defence in Her Britannic Majesty's Government of the United Kingdom of Great Britain and Northern Ireland, Farnborough (GB)

( * ) Notice: Subject to any disclaimer, the term of this patent is extended or adjusted under 35 U.S.C. 154(b) by 0 days.

(21) Appl. No.: 09/318,197

(22) Filed: May 25, 1999

(30) Foreign Application Priority Data

Jun. 3, 1998 (GB) .............................. 9811783

(51) Int. Cl.⁷ ........................ C09K 19/02; G02F 1/1337
(52) U.S. Cl. ........................ 349/172; 349/123; 349/174
(58) Field of Search .............................. 349/172, 174, 349/123

(56) References Cited

U.S. PATENT DOCUMENTS

| | | | |
|---|---|---|---|
| 5,594,571 A | | 1/1997 | Hanyu |
| 5,604,613 A | | 2/1997 | Shinjo et al. |
| 5,654,784 A | | 8/1997 | Yasuda et al. |
| 6,084,649 A | * | 7/2000 | Amano et al. ............... 349/96 |
| 6,151,096 A | * | 11/2000 | McDonnell et al. ........ 349/188 |
| 6,169,592 B1 | * | 1/2001 | Choi ........................ 349/124 |
| 6,307,610 B1 | * | 10/2001 | Jones ........................ 349/133 |
| 6,312,546 B1 | * | 11/2001 | Bannister et al. ........... 156/230 |

FOREIGN PATENT DOCUMENTS

| | | | |
|---|---|---|---|
| EP | 0626607 | 11/1994 | |
| EP | 0732610 | 9/1996 | |
| EP | 0732610 A2 | * 9/1996 | ......... G02F/1/1337 |
| EP | 0 782 032 | 10/1996 | |
| WO | 9428458 | 12/1994 | |
| WO | 9518989 | 7/1995 | |
| WO | 98/04953 | 2/1998 | |

OTHER PUBLICATIONS

Search Report regarding corresponding Great Britain Application No. GB 9912541.1 dated Jul. 26, 1999.

* cited by examiner

Primary Examiner—Robert H. Kim
Assistant Examiner—Mike Qi
(74) Attorney, Agent, or Firm—Renner, Otto, Boisselle & Sklar

(57) ABSTRACT

In the manufacture of a ferroelectric liquid crystal cell, alignment layers provided on the inside surfaces of the substrate structures for imparting a preferred alignment to the molecules of the liquid crystal layer in the vicinity of the layers are formed by deposition of two different alignment solutions, such as LQT120 and JALS212 for example, on the substrate structures. A mixture of the alignment solutions was applied by spin coating and subsequently the solvent was evaporated by prebaking prior to a further baking step and a rubbing step to impart a preferred alignment direction. The resulting alignment layers have a speckled structure in which areas of one type are interspersed within areas of another type. The different areas have different alignment properties which serve to control switching of molecules of the liquid crystal material between alignment states in response to an applied electric field. In this manner it is possible to effect control of the partial switching behaviour of the device and to control the analogue greyscale in a display device.

16 Claims, 3 Drawing Sheets

LQT120+JALS212  2:1/vol APFxy1

| Alignment layers | Vmin | $\tau$-min (10%) | $\tau$-min (90%) | Partial switch width |
|---|---|---|---|---|
| LQT120+JALS 212 mixture | 32.5 | 28 | 44 | 16 |
| JALS212 | 40 | 18.9 | 21.5 | 2.6 |
| LQT120 | 25 | 19.3 | 23.3 | 4 |
| LQT120/JALS212 Mixture one layer only (other layer LQT120 only) | 30 / 35 | 21 / 21 | 40 / 49 | 19 / 28 |

LIQUID CRYSTAL DEVICE MANUFACTURING METHODS OF CONTROLLING A PARTIAL SWITCHING

This invention relates to methods of manufacturing ferroelectric and antiferroelectric liquid crystal devices, and is concerned more particularly with the formation of at least one alignment layer contacting a layer of liquid crystal material within the device.

The surface stabilised ferroelectric liquid crystal device (SSFLCD) possesses the advantage over other liquid crystal devices, such as the twisted nematic liquid crystal device, that it is a bistable device which can be switched between two states by switching pulses of alternate polarity and which will remain in one state in the absence of a switching pulse until a switching pulse of opposite polarity is applied to switch it to the opposite state. By contrast, in operation of a twisted nematic liquid crystal device, a drive signal must be applied continuously to maintain the device in one of its states. It is also a particular advantage of SSFLCD's that the individual switching elements can be passively addressed without requiring an active matrix in which a respective switching transistor is associated with each switching element.

As is well known, a conventional SSFLCD typically includes a cell in which a layer of chiral smectic ferroelectric liquid crystal material is contained between two parallel transparent substrates provided on their inside surfaces with electrode structures which may be in the form of row and column electrode tracks crossing one another to form an addressable matrix of switching elements utilising different areas of the liquid crystal material. Such switching elements are typically addressed on a line-by-line basis by applying data pulses in parallel to the column electrode tracks, each data pulse being either a switching pulse or a non-switching pulse, and by applying strobe pulses to the row electrode tracks so as to switch selected switching elements along each row from one state to the other under the effect of the electric field produced by the voltage difference between the data pulse and the strobe pulse applied to the relevant electrode tracks.

Furthermore rubbed alignment layers may be provided on the inside faces of the substrates in order to impart a preferred alignment to the molecules of the liquid crystal material in the vicinity of the alignment layers. In general this leads to the liquid crystal molecules being uniformly aligned in microlayers extending perpendicularly to the substrates with the molecules in each microlayer adopting a chevron geometry due to the alignment of the molecules with the alignment layers on both sides of the liquid crystal layer. However it should be understood that such a device structure is only one possible example of different structures of liquid crystal device to which the invention is applicable, and furthermore the particular addressing arrangement described is given as only one example of addressing arrangement which may be used in such a device.

Furthermore, in certain applications, it is possible to arrange for partial switching of the switching elements of the device by means of a switching signal of reduced voltage and/or reduced duration so that only a part of the area of the liquid crystal material corresponding to the switching element changes state. In the case where the device is a display device and the two fully-switched states of each switching element correspond to black and white states, such partial switching can be used to provide analogue greyscale. However the control of greyscale is rendered difficult by the problem of controlling domain formation during partial switching of the device.

A number of proposals have previously been made for controlling domain formation in a ferroelectric liquid crystal device. For example, JP 03048819 (Matsushita) and JP 04127124 (Asahi Glass) disclose techniques for fabricating arrays of microstructures within the device to provide nucleation points for controlling domain formation within the liquid crystal material. However such techniques require extra cell fabrication steps which lead to increased manufacturing complexity and cost.

Furthermore E. Matsui and A. Yasuda, FLC 95 Abstracts (1995) 97–99 and EP 0595219A (Sony) disclose techniques in which small balls are distributed in the liquid crystal material to act as nucleation points for controlling domain formation. However it is difficult to obtain good uniformity of distribution of such balls within the liquid crystal material. JP 194635/1994 and EP 0586014A (Phillips) disclose techniques for forming a structure in which non-reactive chiral liquid crystal molecules are captured in an anisotropic 3-D network structure made of a polymeric material. In this technique the network structure stabilises microscopic domains having opposite polarisation directions, so that greyscale can be maintained even after the applied electric field has been removed. However, because of the relatively high concentration of polymer which remains within the liquid crystal material after manufacture, the viscosity of the liquid crystal material is increased and this tends to lead to slower switching.

Furthermore European Patent Application No. 97309839.5 discloses a technique in which a dopant is mixed with the liquid crystal material, and the dopant is then caused to separate out of the liquid crystal material as a result of a change in the processing conditions, such as a change in temperature or application of ultraviolet light, which preferably results in a change in phase of the dopant so as to provide nucleation points for controlling domain formation within the liquid crystal material.

D. C. Ulrich, M. J. Cherrill and S. J. Elston, "Surface Modification and the Switching Processes in Ferroelectric Liquid Crystals", Liquid Crystals, 1997, Vol. 23, No. 6, 797–802 discusses the manner in which switching of ferroelectric liquid crystal devices is affected by inherent seed sites, such as spacer beads and dirt particles, for example, and proposes defect seeding by deliberate introduction of seed features during manufacture of a device. In the particular example investigated in this paper, seed points and lines are produced by depositing a layer of photoresist of about 0.5 $\mu$m thickness on the inside surface of one of the substrates of the device, the layer being subsequently exposed through a suitable mask, developed and hard baked to produce the seed points and/or lines, prior to coating with the alignment layer. However such a method involves a significant number of additional manufacturing steps, and thus increases both the complexity and the cost of production.

EP 0732610A2 discloses the use of an alignment layer comprising two or more types of polymer in a twisted nematic (TN) liquid crystal display device in order to improve contrast and widen the viewing angle of the device. The difference between the maximum SP (solubility parameter) value and the minimum SP value of the polymers used is at least 1. Preferably at least one of the polymers is a polymer containing siloxane or fluorine. In this manner it can be ensured that the alignment layer is capable of forming two or more different alignment states, so that two or more liquid crystal alignment states, for which the pretilt angle of the liquid crystal molecules differs, are present in the device. It is therefore ensured that the viewing angle characteristics are widened as compared with a similar device having only a single liquid crystal alignment state. However such an alignment layer is not suitable for improving the partial switching behaviour of a ferroelectric liquid crystal device.

It is an object of the invention to provide a ferroelectric or antiferroelectric liquid crystal device manufacturing method which can be used to improve the partial switching properties of the device.

According to the present invention there is provided a method of manufacturing a ferroelectric or antiferroelectric liquid crystal device in order to improve its partial switching behaviour, the device comprising a layer of ferroelectric or antiferroelectric liquid crystal material contacted by at least one alignment layer, wherein the alignment layer is formed by deposition on a substrate of at least two different alignment solutions having properties such that, when the solutions are brought together, they form areas having different alignment characteristics relative to the liquid crystal material which serve to control switching of molecules of the liquid crystal material between different alignment states in response to an applied electric field in order to permit partial switching of the device.

The areas of different alignment properties within the alignment layer formed in this manner interact differently with different regions of the liquid crystal material so that, by suitable control of the sizes and shapes of the different areas, it is possible to control the switching behaviour of the liquid crystal material in response to an applied electric field. In particular it is possible to effect control of the partial switching behaviour of the device, and to thereby control the analogue greyscale in a display device which relies on such partial switching for the display of grey levels.

The manner in which the areas of different alignment properties interact with the liquid crystal material may differ in different devices produced by the method of the invention. For example, the alignment solutions may contain materials having different interaction energies relevant to the liquid crystal material, in which case the switching behaviour of the liquid crystal material will be determined by the different anchoring properties of the alignment materials. Additionally or alternatively the alignment solutions may contain materials having different dielectric permittivities, in which case the switching properties of the liquid crystal material will be modified by the different voltage drops across the alignment materials.

Furthermore the areas of different alignment properties may form a pattern in which some areas are raised relative to other areas of the pattern so as to impart a rough surface to the alignment layer.

Such a method can be used to produce different surface features which serve as nucleation sites to control domain formation during switching of the liquid crystal material. Such surface features can be either small round features which will tend to act as nucleation points to speed up switching or alternatively elongate features which will tend to act as pinning points which slow down switching. A combination of these features may be found in the same alignment layer.

Furthermore, in order to ensure that the alignment materials form areas within the alignment layer having different alignment properties, either the alignment materials themselves are immiscible relative to one another, or alternatively the alignment materials are deposited on the substrate within respective solvents which are immiscible relative to one another, the solvents subsequently being evaporated leaving the alignment materials forming the required areas of the alignment layer.

Furthermore at least one of the alignment solutions may be mixed with a surfactant prior to deposition on the substrate so as to modify the wetting of the substrate by the solution. This can be used to produce surface features which again result in differential alignment properties serving to control switching of the liquid crystal material between alignment states in response to an applied electric field.

The invention also provides a ferroelectric or antiferroelectric liquid crystal device having a layer of ferroelectric or antiferroelectric liquid crystal material contacted by at least one alignment layer, wherein the alignment layer contains areas formed by deposition of at least two different alignment solutions on a substrate, said areas comprising polymers having different alignment characteristics relative to the liquid crystal material which serve to control switching of the molecules of the liquid crystal material between different alignment states in response to an applied electric field in order to permit partial switching of the device.

In order that the invention may be more fully understood, preferred methods in accordance with the invention will now be described, by way of example, with reference to the accompanying drawings, in which.

Before preferred manufacturing methods in accordance with the invention are described below, the typical structure of a ferroelectric liquid crystal cell will first be described with reference to FIG. 1. It should be understood that the invention is not limited to the manufacture of a ferroelectric liquid crystal cell or to a cell of the particular structure shown in FIG. 1, but that this structure is described merely as an example of a structure to which the method is applicable.

Figure 1:
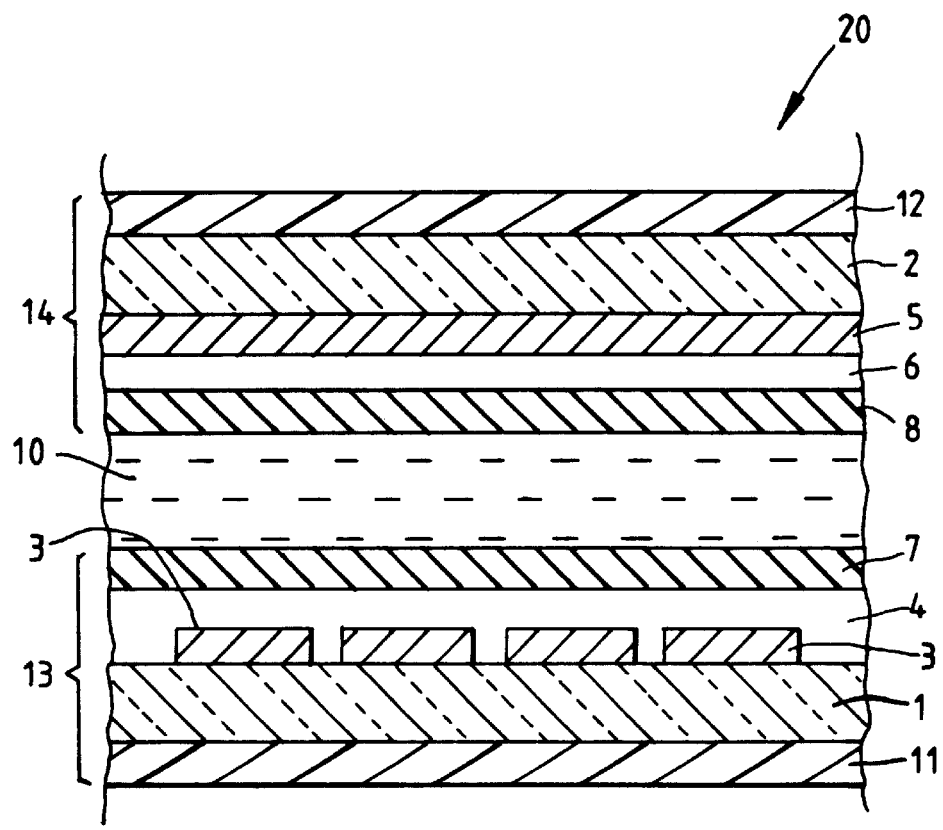
FIG. 1 is a schematic section through a ferroelectric liquid crystal cell.

Referring to FIG. 1, which shows a section through only a small part of the cell, the ferroelectric liquid crystal cell 20 consists of a layer 10 of the liquid crystal material SCE8 contained between two parallel transparent substrate structures 13 and 14 spaced apart by spacers (not shown). Each of the substrate structures 13 or 14 consists of a glass substrate 1 or 2 on which electrode structures, made of indium tin oxide (ITO) for example, are formed by known deposition, masking and etching techniques. More particularly a plurality of parallel 100 nm-thick transparent data electrodes 3 are formed on the surface of the substrate 1, and a transparent insulating film 4, made of silicon dioxide ($SiO_2$) for example, is provided on top of the data electrodes 3. Furthermore a plurality of parallel 100 nm-thick transparent strobe electrodes 5, made of the same material as the data electrodes 3, are formed on the surface of the substrate 2 so as to cross the data electrodes 3 at right angles, and a transparent insulating film 6, made of the same material as the insulating film 4, is provided on top of the strobe electrodes 5.

Also 70 nm-thick alignment layers 7 and 8 are provided on the inside surfaces of the substrate structures 13 and 14 on top of the insulating films 4 and 6, and a uniaxial alignment treatment, such as rubbing in a required direction by buffing with a soft cloth made of rayon, for example, is applied to the alignment layers 7 and 8 in order to impart a preferred alignment to the molecules of the liquid crystal layer 10 in the vicinity of the alignment layers 7 and 8. The alignment layers 7 and 8 may be organic high polymer films, such as polyimide films, Nylon (Registered Trade Mark) films, polyvinyl alcohol films or silicon dioxide films.

A polarisation layer 11 is formed on the other surface of the glass substrate 1 to the surface on which the data electrodes 3 are formed, and a polarisation layer 12 is formed on the other surface of the glass substrate 2 to the surface on which the strobe electrodes 5 are formed. The polarisation layers 11 and 12 are aligned in such a manner that their respective polarisation axes intersect substantially at right angles and such that a light state or a dark state is produced depending on the switching state of the liquid crystal material within the cell. As is well understood to those skilled in the art, the switching state of the ferroelectric liquid crystal material at the intersections of the data and strobe electrodes 3 and 5 (that is at the pixels) is controlled by the application of data and strobe pulses to the data and strobe electrodes 3 and 5 so that the device may be used to display a moving image.

In the manufacture of such a ferroelectric liquid crystal cell, the substrate structures 13 and 14 are produced by a series of fabrication steps culminating in deposition of the alignment layers 7 and 8 and rubbing of the alignment layers in the required directions. Subsequently the two substrate structures 13 and 14 are interconnected in the required manner with a gap therebetween, and the cell is then filled with the liquid crystal material. The following description is concerned with the manner in which one or both of the alignment layers 7 and 8 may be produced using methods in accordance with the invention in order to control the partial switch width of the cell and thereby enable clearly defined grey levels to be produced by appropriate partial switching of the cell.

In one example of a method for manufacturing such a cell in accordance with the invention, one or both of the alignment layers was produced as follows.

After the application of appropriate cleaning treatments to the substrate, the insulating film constituting the barrier layer was applied by spin coating the polymer AT902 diluted with butyrolactone in the proportions 1:1 at a spin speed of 1500 rpm for 20 seconds. The substrate was then subjected to prebaking at 100° C. for 10 minutes in order to evaporate the solvent, prior to oven baking at 200° C. for 105 minutes (including the oven ramp time of 15 minutes) to harden the layer. The alignment layer was then deposited on the barrier layer utilising a mixture of two solutions containing the polymers JALS212 and LQT120 respectively. More particularly the first solution comprised 10 ml of JALS212 in 10 ml of butyrolactone, and the second solution comprised 6.7 ml of LQT120 in 13.4 ml of N-methyl pyrrolidinone. In each case 5% solid content for the supplied solution is assumed. The mixture was applied to the substrate by spin coating at a speed of 2500 rpm for 10 seconds, and subsequently the solvent was evaporated by prebaking at 100° C. for 30 minutes. Subsequently the substrate was oven baked at 200° C. for 60 minutes (including an oven ramp time of 30 minutes) in order to polymerise the alignment layer, and the alignment layer was subsequently rubbed in the manner described above to impart a preferred alignment direction.

Figure 2:
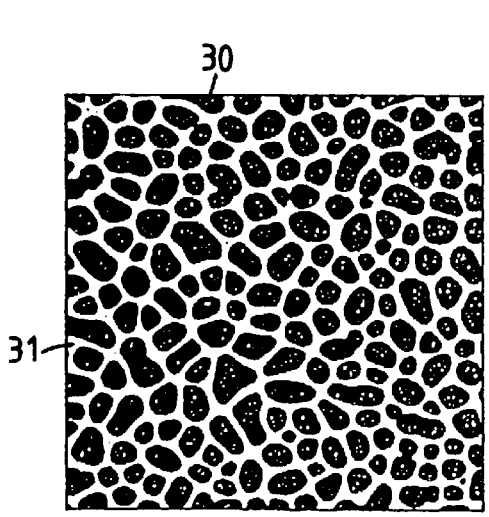
FIGS. 2 and 3 are atomic force micrographs, on two different scales, of parts of an alignment layer formed by a first method in accordance with the invention.

Because of the immiscibility of the two polymerised materials, the resulting alignment layer has a speckled structure as shown in the atomic force micrograph of FIG. 2 in which areas 30 (shown as dark areas in the figure) are interspersed within areas 31 (shown as light areas in the figure). The areas 30 and 31 may each be formed by a respective one of the polymerised materials, or alternatively one or both of the areas may be formed from both materials. In this case the areas 31 are raised relative to the areas 30 which form relatively deep recesses in the surface of the alignment layer. It is not yet known whether one of the polymers forms a surface layer with the other polymer forming discrete areas on top of the surface layer or whether such areas (and also perhaps the surface layer itself) are formed from mixtures of the two polymers or of phase-separated polymers.

Figure 3:
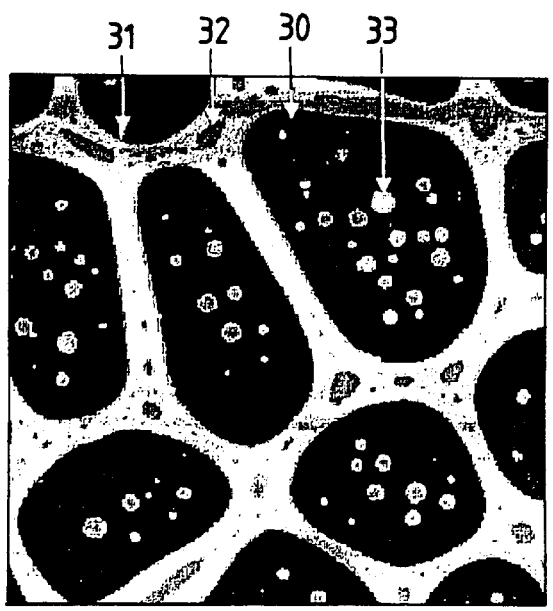

FIG. 3 shows a detail of the surface of the alignment layer on an enlarged scale, and it should be noted that there is also a finer structure superimposed on the surface structure already described with reference to FIG. 2 consisting of the areas 30 and 31. This finer structure comprises relatively shallow recesses 32 in the raised areas 31 and raised lumps 33 within the recessed areas 30. In this case the raised areas 31 are approximately 500–700 nm in width and are raised by a height of about 60 nm relative to the recessed areas 30. Furthermore the raised areas 31 are inclined at their edges by angles of the order of 50–60°. On the other hand the recessed areas 30 have lateral dimensions in the range of 1.5–3 μm. The total area of the raised areas 31 combined with the area of the lumps 33 was found to be approximately 50% of the overall area of the cell, the remaining area being accounted for by the total area of the recessed areas 30 less the area of the lumps 33.

Figure 4:
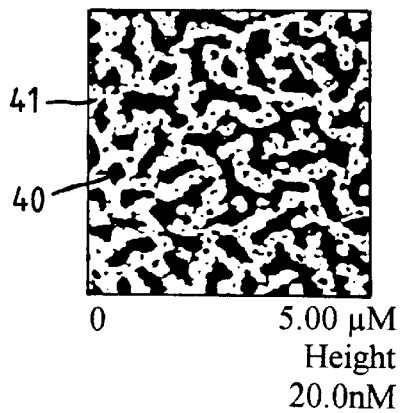
FIG. 4 is an atomic force micrograph showing height variation in a portion of an alignment layer formed by a second method in accordance with the invention.

In a further example the two alignment materials, JALS212 and LQT120, were mixed in the proportions 1:1 by weight prior to the resultant mixture being deposited on the substrate structure by spin coating. The alignment layer was otherwise produced in the same manner as in the preceding example, and the surface structure of the resulting alignment layer is shown in FIG. 4. In this case recessed areas 40 of one alignment material were produced within raised areas 41 of the other alignment material, the raised areas 40 typically having a width of 100–300 nm and a length of 400–1,200 nm, and the recessed areas 40 typically having a width of 50–200 nm and a length of 400–1,200 nm. Furthermore the height difference between the recessed areas 40 and the raised areas 41 was about 20 nm.

Figure 5:
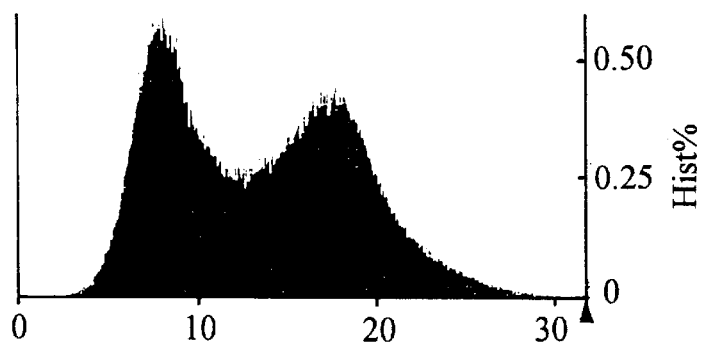
FIG. 5 is a bearing analysis showing the height variation over a portion of such an alignment layer.

Furthermore FIG. 5 graphically shows the results of bearing analysis over a portion of the surface of such an alignment layer indicating the proportion of the surface at depths in the range of 0–30 nm relative to a plane 0 extending above the highest part of the surface. The two peaks show the predominance of two depths corresponding to the mean depths of the recessed and raised areas 40 and 41.

Figure 6:
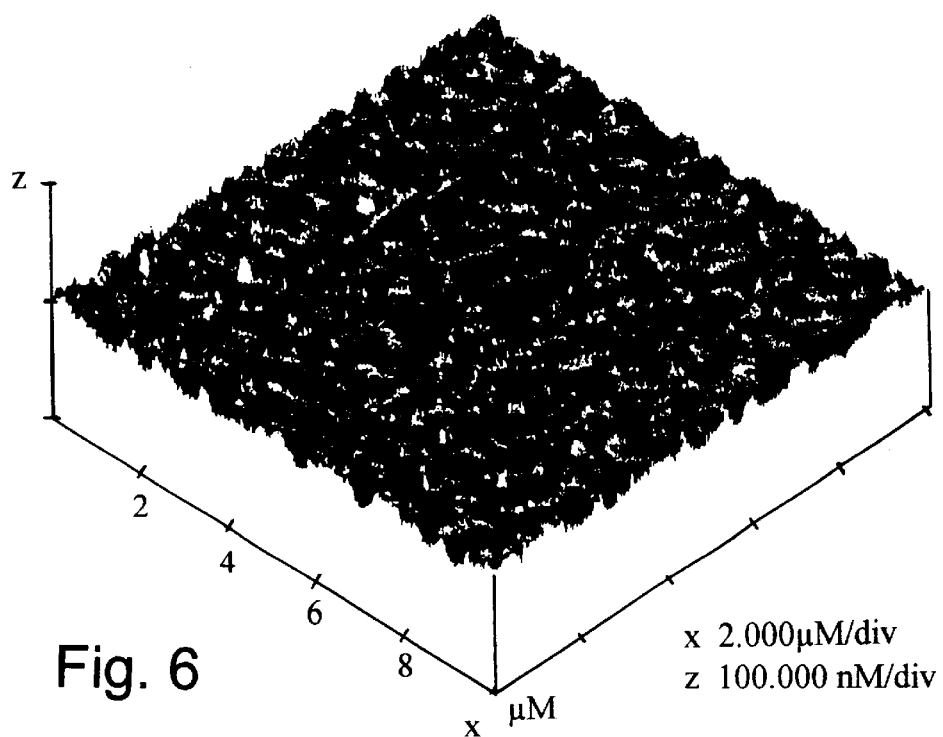
FIG. 6 is a three-dimensional AFM image of a portion of the alignment layer formed by the first method.

Furthermore FIG. 6 graphically shows the surface structure of a part of the alignment layer in the first example described with reference to FIGS. 2 and 3, the scale being 2 μm per division along the X axis and 100 nm per division along the z axis so that the variation in height is exaggerated by this graph.

Figures 7, 8:
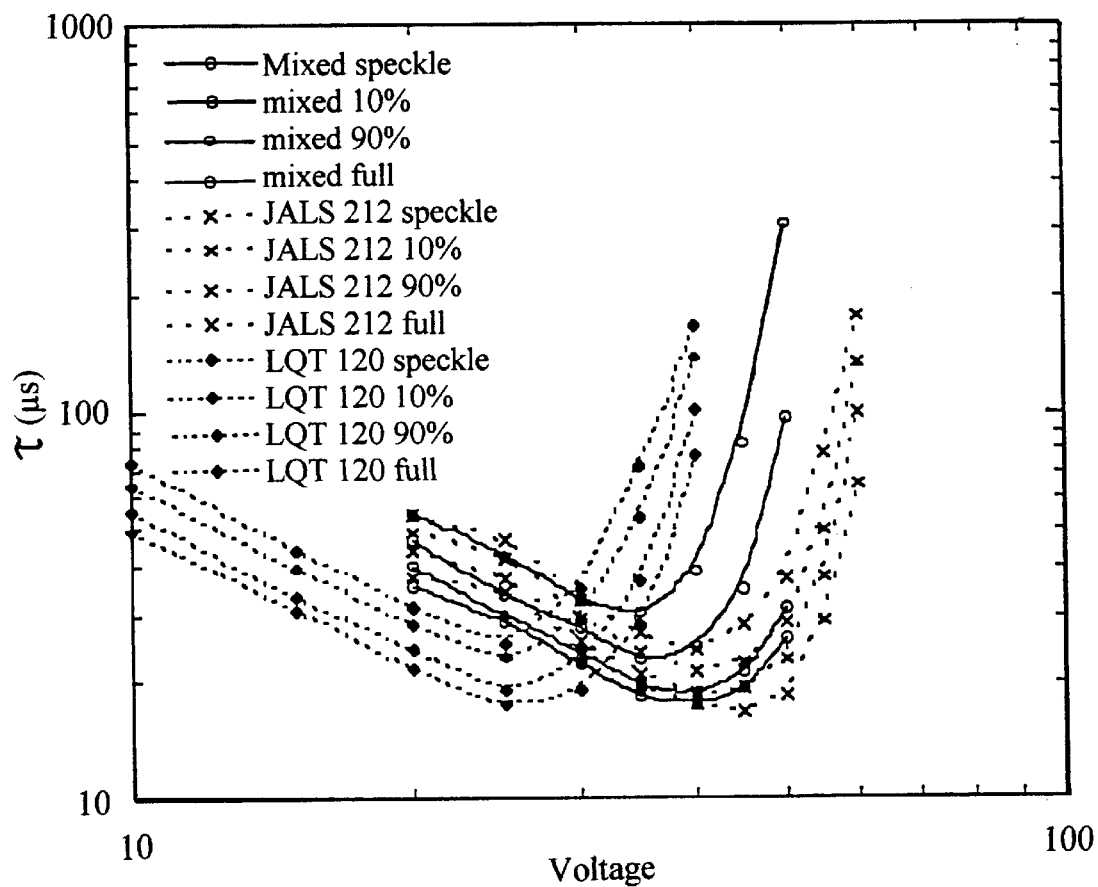
FIG. 7 is a graph showing the $\tau$-V characteristics of a number of cells having alignment layers of different constituencies.
FIG. 8 is a table comparing the partial switching regions of a number of such cells.

A series of experiments were carried out in which alignment layers were produced in accordance with the first example and also alignment layers were produced using the alignment material JALS212 only and the alignment material LQT120 only for comparison purposes. Sample cells containing the liquid crystal material SCE8 and having alignment layers of these three types were produced. A further sample cell containing SCE8 and having different alignment layers on its two substrates was also produced in which one of the alignment layers was produced in accordance with the first example and the other alignment layer was produced using the alignment material LQT120 only. Switching pulses of voltages in the range of 10–100V and duration τ were then applied to the first three sample cells and points were plotted corresponding to the values of τ at which the liquid crystal material begins to switch (speckle), at which 10% of the material is switched, at which 90% of the material is switched and at which substantially all the material is switched (full switching). The results for the three sample cells are shown in FIG. 7 with the solid curves denoting the switching characteristics utilising the mixed alignment layer of the first example described above. It will be appreciated that the width of the partial switching region is much greater where the mixed alignment layer is used as compared with the cases where the alignment layer consists of JALS212 alone or LQT120 alone.

FIG. 8 is a table showing the partial switching results obtained with all four sample cells having different alignment layers, and in particular the values of the minimum switching voltage $V_{min}$, the minimum switching time $\tau_{min}$ (10%) at which 10% of the liquid crystal material switches, the minimum switching time $\tau_{min}$ (90%) at which 90% of the liquid crystal material switches and the partial switch width (which occurs at $V_{min}+5V$). In all cases the liquid crystal material was SCE8. It will be appreciated from this table that different alignment layers give different switching characteristics in cells containing the same liquid crystal material. In particular an alignment layer utilising the mixture LQT120+JALS212 may have a substantially wider partial switching region than cells having alignment layers utilising either of these materials alone. In the case of the fourth sample cell in which only one of the two alignment layers is of mixed composition, partial switching results are given for two values of the minimum switching voltage $V_{min}$, and it will be appreciated that a substantially wider partial switching region is again obtained by use of the alignment layer of mixed composition.

It is believed that the patterning of the surface of the alignment layer with raised and recessed areas so as to impart surface roughness is caused by polymer microphase separation due to the immiscibility of the two polymers. However it is also possible to produce such a surface structure by utilising two different solvent carriers to which the monomers are added, and which can be used to separate the resulting polymeric materials in the alignment layer. The particular interactions between the polymeric materials in the alignment layer is dependent on the interaction energies of the materials with respect to the liquid crystal material and/or the different miscibilities of the materials and/ or the different alignment characteristics of the materials, as well as the relative ratio and dilution of the materials and the choice of any solvents. The width and height of the raised and recessed areas in the alignment layer is also dependent on the particular processing conditions such as the temperature and time of any applied heat treatment during polymerisation and the length of any subsequent evaporation time, as well as on the degree of wetting of the surface to which the alignment layer is applied. It may also be useful to apply a wait stage, that is a particular period during which the substrate is maintained at a predetermined temperature, e.g. room temperature, to allow the polymeric materials to phase separate and the solvent to begin to evaporate, as this will typically allow further control of the surface structure.

Furthermore a surfactant may be used to modify the wetting of the substrate surface by the alignment layer so as to impart certain surface features to the alignment layer or so as to modify the interactions between the polymeric materials. Furthermore it is possible for the alignment layer to be lightly rubbed after a prebake or softbake treatment applied to the alignment layer in order to alter the distribution and/or shape of the surface features. After the prebake at 100° C. previously referred to, for example, the polymer is not fully cured and is relatively soft. Phase separation and domain formation as a result of surface wetting should have occurred, so that a gentle rub can be used to affect the size and orientation of the domains. For example such rubbing may be used to increase the length and/or reduce the height of the areas 30 or 31 in FIG. 2.

In a variant the alignment layer comprises polymeric materials having difference dielectric permittivities so that the switching behaviour of the liquid crystal material is affected not only by this surface roughness of the alignment layer and the interactions between the alignment layer and the liquid crystal material, but also by the voltage drop across the alignment layer which is modified by the different dielectric permittivities of the polymeric materials.

Finally, in a further variant, a block copolymer material is used in place of the two or more polymeric materials used in the alignment layers already discussed. Such a block copolymer comprises repeated blocks of two or more chemically different regions along its length, for example of the form ABABAB . . . where the blocks A and B are, say, styrene and butadiene respectively and there are, say, 20 such blocks. In order to provide areas within each alignment layer having dimensions of the order of 2–5 μm, an appropriate block copolymer material would require a greater number of repeat blocks than usual, for example more than 20 such blocks.

What is claimed is:

1. A method of controlling a partial switching behaviour of a ferroelectric or antiferroelectric liquid crystal device having two defined switching states and a layer of ferroelectric or antiferroelectric liquid crystal material contacted by at least one alignment layer, the method comprising the steps of:

(a) depositing on a substrate at least two different alignment solutions having different alignment characteristics relative to the liquid crystal material, (b) bringing together the solutions to form areas of the alignment layer having different alignment characteristics in contact with the liquid crystal material, (c) applying an electric field to the liquid crystal material to effect switching of at least some of the liquid crystal material into a partial switching state intermediate the two defined switching states, and (d) controlling the partial switching behaviour of the liquid crystal material by means of the areas of the alignment layer having different alignment characteristics which serve to control switching of molecules of the liquid crystal material between different alignment states.

2. A method according to claim 1, wherein the alignment solutions contain materials having different interaction energies relative to the liquid crystal material.

3. A method according to claim 1, wherein the alignment solutions contain materials having different dielectric permittivities.

4. A method according to claim 1, wherein said areas form a pattern in which some areas are raised relative to other areas of the pattern so as to impart a rough surface to the alignment layer.

5. A method according to claim 4, wherein said raised areas are generally of a different shape to said other areas of the pattern.

6. A method according to claim 4, wherein said raised areas are generally of a different distribution to said other areas of the pattern.

7. A method according to claim 1, wherein the alignment solutions contain, in solution, alignment materials which are themselves immiscible relative to one another.

8. A method according to claim 1, wherein the alignment solutions contain alignment materials which are deposited on the substrate within respective solvents which are immiscible relative to one another, and the solvents are subsequently evaporated leaving the alignment materials forming said areas within the alignment layer.

9. A method according to claim 1, wherein at least one of the alignment solutions is mixed with a surfactant prior to deposition on the substrate so as to modify the wetting of the substrate by the solution.

10. A method according to claim 1, wherein the alignment solutions are deposited on the substrate by spin coating.

11. A method according to claim 1, wherein the alignment solutions contain alignment materials which are polymerised to form said areas having different alignment properties.

12. A method according to claim 1, wherein the alignment layer is rubbed to impart a preferred alignment direction to the alignment layer.

13. A method according to claim 1, wherein a heat treatment is applied to the alignment layer after deposition of the alignment solutions in order to cure the alignment layer.

14. A method according to claim 1, wherein respective alignment layers are deposited on two parallel substrates so as to contact the layer of liquid crystal material contained therebetween.

15. A method according to claim 1, wherein the alignment layer is deposited on top of electrode tracks applied to the substrate.

16. A ferroelectric or antiferroelectric liquid crystal device having controlled partial switching behaviour among two defined switching states, and a layer of ferroelectric or anti-ferroelectric liquid crystal material contacted by at least one alignment layer, the device comprising:

(a) a substrate having at least two different alignment solutions deposited thereon, the alignment solutions having different alignment characteristics relative to the liquid crystal material, (b) wherein the solutions are brought together to form areas of an alignment layer having different alignment characteristics in contact with the liquid crystal material, and (c) means for applying an electric field to the liquid crystal material to effect switching of at least some of the liquid crystal material into a partial switching state intermediate the two defined switching states, (d) wherein the partial switching behaviour of the liquid crystal material is controlled by means of the areas of the alignment layer having different alignment characteristics which serve to control switching of molecules of the liquid crystal material between different alignment states.

* * * * *